(12) United States Patent
Mertens et al.

(10) Patent No.: US 10,906,146 B2
(45) Date of Patent: Feb. 2, 2021

(54) ZERO CLAMPING FORCE CONFORMING FIXTURE

(71) Applicant: UNITED TECHNOLOGIES CORPORATION, Farmington, CT (US)

(72) Inventors: Matthew A. Mertens, West Hartford, CT (US); Gordon Miller Reed, Plantsville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 210 days.

(21) Appl. No.: 16/016,341

(22) Filed: Jun. 22, 2018

(65) Prior Publication Data
US 2019/0389018 A1    Dec. 26, 2019

(51) Int. Cl.
*B23Q 3/18*    (2006.01)
*B23P 15/04*    (2006.01)
*F01D 25/28*    (2006.01)

(52) U.S. Cl.
CPC ............ *B23Q 3/18* (2013.01); *B23P 15/04* (2013.01); *F01D 25/285* (2013.01); *F05D 2230/50* (2013.01)

(58) Field of Classification Search
CPC ............ B32Q 3/18; B23P 15/04; F01D 25/285
USPC .................................................... 156/275.5
See application file for complete search history.

(56) References Cited

U.S. PATENT DOCUMENTS

| | | | | |
|---|---|---|---|---|
| 2,284,647 | A * | 6/1942 | Ewald | A23N 3/00 414/675 |
| 7,172,676 | B2 | 2/2007 | DeMeter | |
| 8,623,165 | B2 * | 1/2014 | Fessler-Knobel | B23Q 3/084 156/275.5 |
| 9,102,025 | B2 | 8/2015 | Raffles | |
| 9,346,141 | B2 | 5/2016 | Fessler-Knobel et al. | |
| 2011/0239934 | A1 * | 10/2011 | Soucy | F01D 5/288 118/505 |
| 2018/0087382 | A1 | 3/2018 | Heinrich et al. | |

* cited by examiner

*Primary Examiner* — Michael N Orlando
*Assistant Examiner* — Elizabeth Bradford
(74) *Attorney, Agent, or Firm* — Snell & Wilmer L.L.P.

(57) ABSTRACT

A zero clamp force fixture assembly may comprise a body comprising a locating surface and a side, a neck extending away from the side of the body, a zero force clamp coupled to the neck, and a universal locating feature coupled to the locating surface. The neck may taper towards an interface with the zero force clamp. The zero force clamp may comprise an upper jaw and a lower jaw.

11 Claims, 9 Drawing Sheets

ZERO CLAMPING FORCE CONFORMING FIXTURE

FIELD

The disclosure relates generally to airfoils in gas turbine engines and related fixtures.

BACKGROUND

Work pieces such as gas turbine engine airfoils, for example, turbine blades or stators may be complex assemblies having multiple manufacturing operations which may include, for example, machining, cutting, grinding, welding, and/or the like which may be conducted on a plurality of manufacturing equipment. To achieve desired manufacturing tolerances, a work piece may be held fast in a precision fixture while manufacturing operations are conducted. Traditionally, each of the plurality of manufacturing equipment may employ differing fixtures which tend to induce compound variances between work pieces. Further, multiple differing fixtures tend to increase setup costs, manufacturing time, part costs, and rework. In the case of gas turbine engine airfoils, these problems are compounded by the complex geometry of the airfoil surfaces. Traditional fixtures may employ a plurality of clamps, straps, and/or similar couplings which may apply a force to points of airfoil surfaces and, where forces are unbalanced and asymmetric, generally tend to lack purchase on airfoil surfaces thereby tending to inhibit precision locating for fixturing operations.

SUMMARY

In various embodiments the present disclosure provides a zero clamp force fixture assembly comprising a body comprising a locating surface and a side, a neck extending away from the side of the body, a zero force clamp coupled to the neck, and a universal locating feature coupled to the locating surface. In various embodiments, the neck may taper towards an interface with the zero force clamp. In various embodiments, the zero force clamp may comprise an upper jaw and a lower jaw.

In various embodiments, the upper jaw is coupled to a hinge proximate the interface and configured to rotate upward, about the hinge, away from a bite point and the lower jaw. In various embodiments, the lower jaw is fixed below the interface and extends beneath the upper jaw toward the bite point. In various embodiments, the upper jaw comprises an upper curing window and the lower jaw comprises a lower curing window. In various embodiments, an interior surface of the upper jaw and an interior surface of the lower jaw are defined by an airfoil surface of an airfoil. In various embodiments, the upper curing window and the lower curing window comprise at least one of, a glass, an acrylic, a sapphire, a fused silica, a fused quartz, or a polycarbonate. In various embodiments, the airfoil may be coupled to the zero clamp force fixture assembly via an adhesive. In various embodiments, the adhesive forms an adhesive layer over the interior surface of the upper jaw and the interior surface of the lower jaw, wherein the layer is between 0.03 in and 0.06 in thick. In various embodiments, the adhesive layer is cured to form a bonded layer defined between the airfoil surface and each of the interior surface of the upper jaw and the interior surface of the lower jaw, wherein the bonded layer extends over 85% to 95% of the airfoil surface. In various embodiments, the adhesive comprises an ultraviolet curing adhesive.

In various embodiments, the present disclosure provides a method of manufacturing a zero clamp force fixture assembly. The method may comprise shaping an upper jaw and a lower jaw of a zero force clamp fixture to conform to a surface of an airfoil, shaping a first curing window to conform to the surface of the airfoil and inserting the first curing window into one of the upper jaw or the lower jaw, locating a body of the zero force clamp fixture with respect to a universal locating feature, and coupling the body to the universal locating feature. The method may include shaping a second curing window to conform to the surface of the airfoil and inserting the second curing window into one of the upper jaw or the lower jaw. In various embodiments, at least one of the first curing window or the second curing window comprises at least one of, a glass, an acrylic, a sapphire, a fused silica, a fused quartz, or a polycarbonate. In various embodiments, the body comprises a neck having an interface comprising a hinge, the upper jaw coupled to the hinge and configured to rotate upward, about the hinge, away from a bite point and the lower jaw In various embodiments, the present disclosure provides a method of fixturing an airfoil. The method may comprise aligning a zero clamp force fixture assembly with a nest, opening a jaw of a zero force clamp and applying an adhesive layer over an interior surface of the jaw, inserting the airfoil into the nest and the zero force clamp and coupling the airfoil to the nest wherein, in response to the coupling, the airfoil is aligned with the zero clamp force fixture assembly, closing the jaw and contacting the adhesive with an airfoil surface, and applying an ultraviolet light and, in response, curing the adhesive into a bonded layer between the airfoil and the zero clamp force fixture assembly. In various embodiments, the adhesive layer is between 0.03 in and 0.06 in thick. In various embodiments, the bonded layer extends over 85% to 95% of the airfoil surface. In various embodiments, the wavelength of the ultraviolet light is between about 150 nm and 400 nm.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
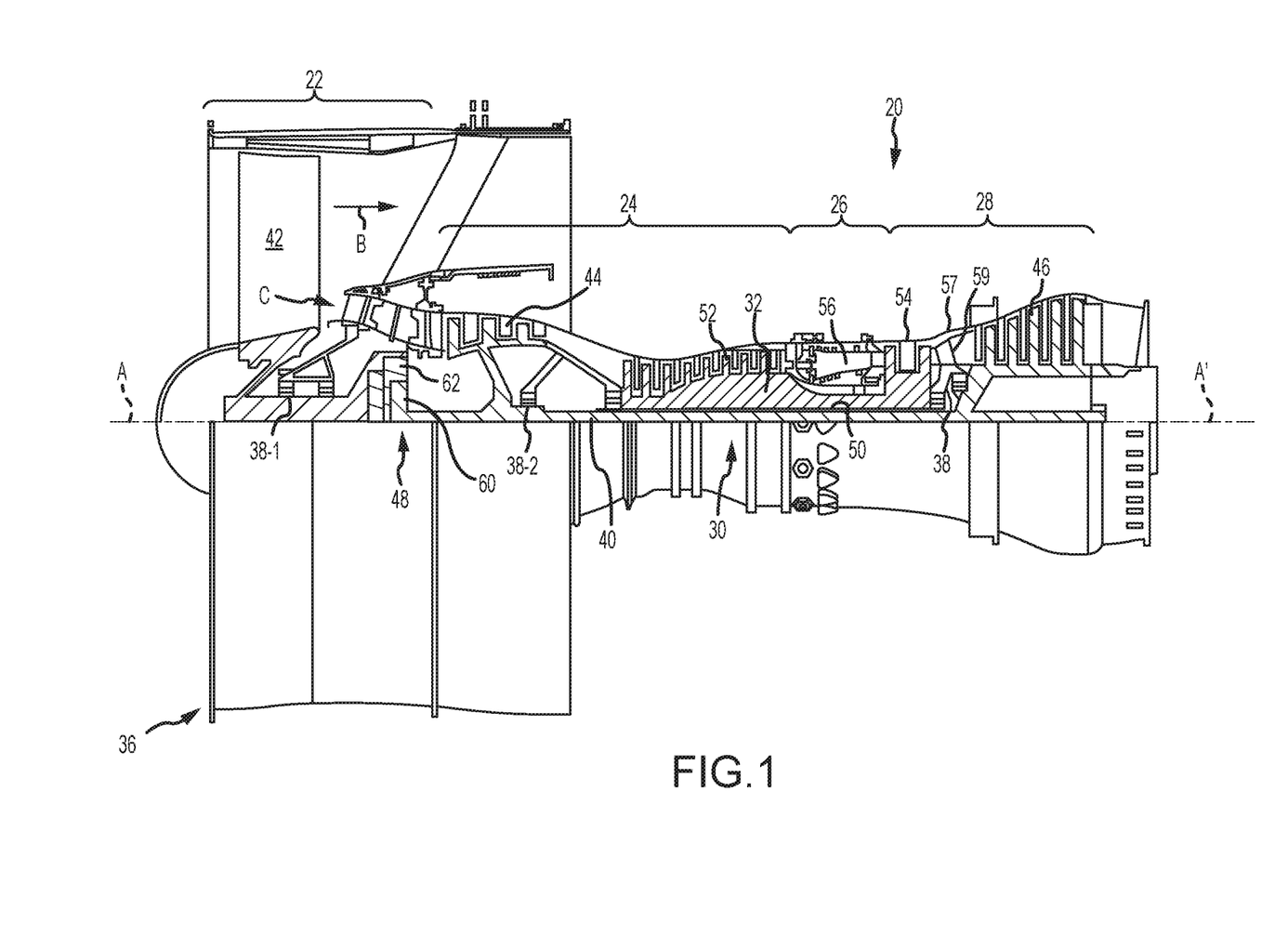
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, each of the LPC 44, HPC 52, HPT 54, and LPT 46 may comprise alternating rows of rotating rotors and stationary stators comprising airfoils. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
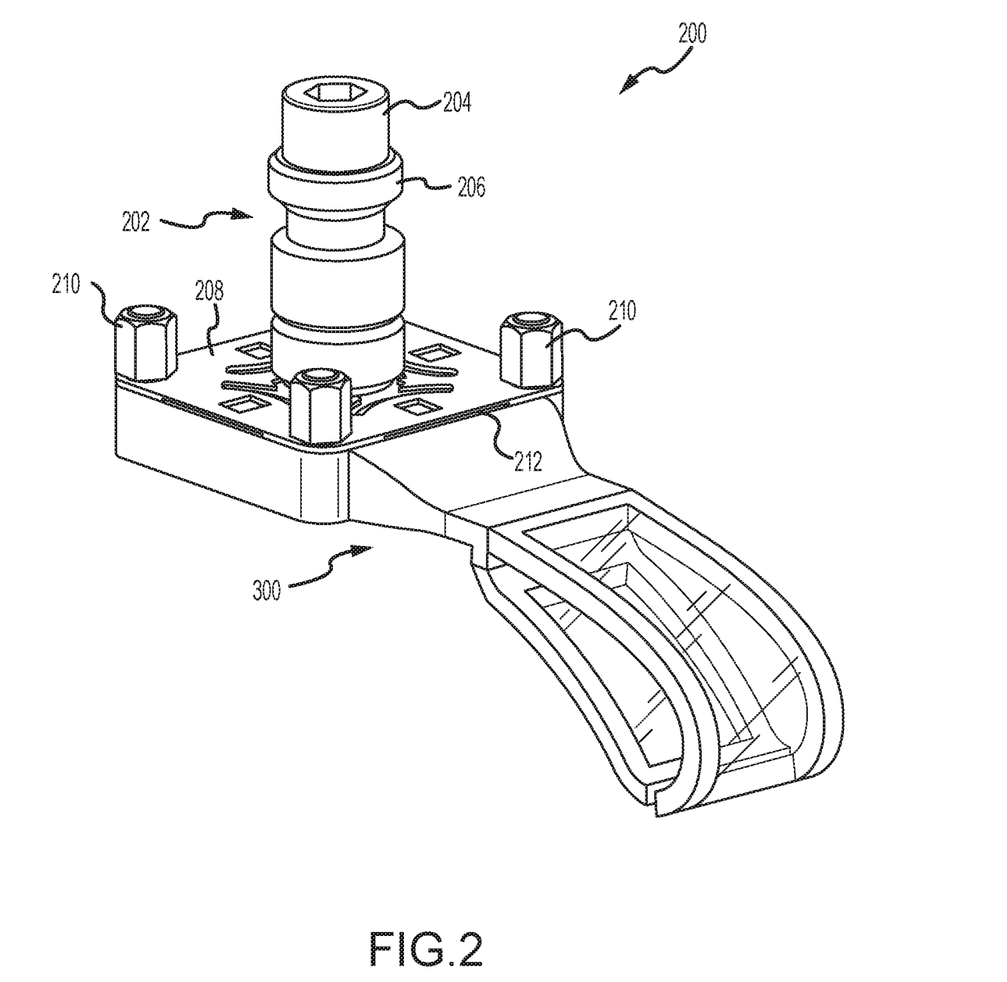
FIG. 2 illustrates a zero clamp force fixture assembly, in accordance with various embodiments.

According to various embodiments and with reference to FIG. 2, a zero clamp force fixture assembly 200 is illustrated. Zero clamp force fixture assembly 200 may comprise a universal locating feature 202 coupled to a zero clamping force fixture 300. Universal locating feature 202 may comprise a spigot 204 having a collet 206. Spigot 204 may be configured to interface with a chuck and drawbar of a plurality of manufacturing equipment. Spigot 204 may be coupled to locating plate 208 and a distal surface of locating plate 208 may, in turn, be coupled to body 302 of zero clamping force fixture 300. In various embodiments, locating plate 208 may comprise a relatively rectangular plate and be coupled to body 302 by fasteners 210 located proximate the vertexes of locating plate 208. Tooling features 212 may be located proximate the sides of locating plate 208 and cut relatively upward (i.e. relatively away from body 302) into the distal surface of locating plate 208. Tooling features 212 may provide clearance between body 302 and locating plate 208 to permit entry of a tool such as, for example, the bit of a flathead screw driver. In this regard, tooling features 212 may tend to allow application of a backing force between body 302 and locating plate 208 tending to separate body 302 from locating plate 208.

Figure 3:
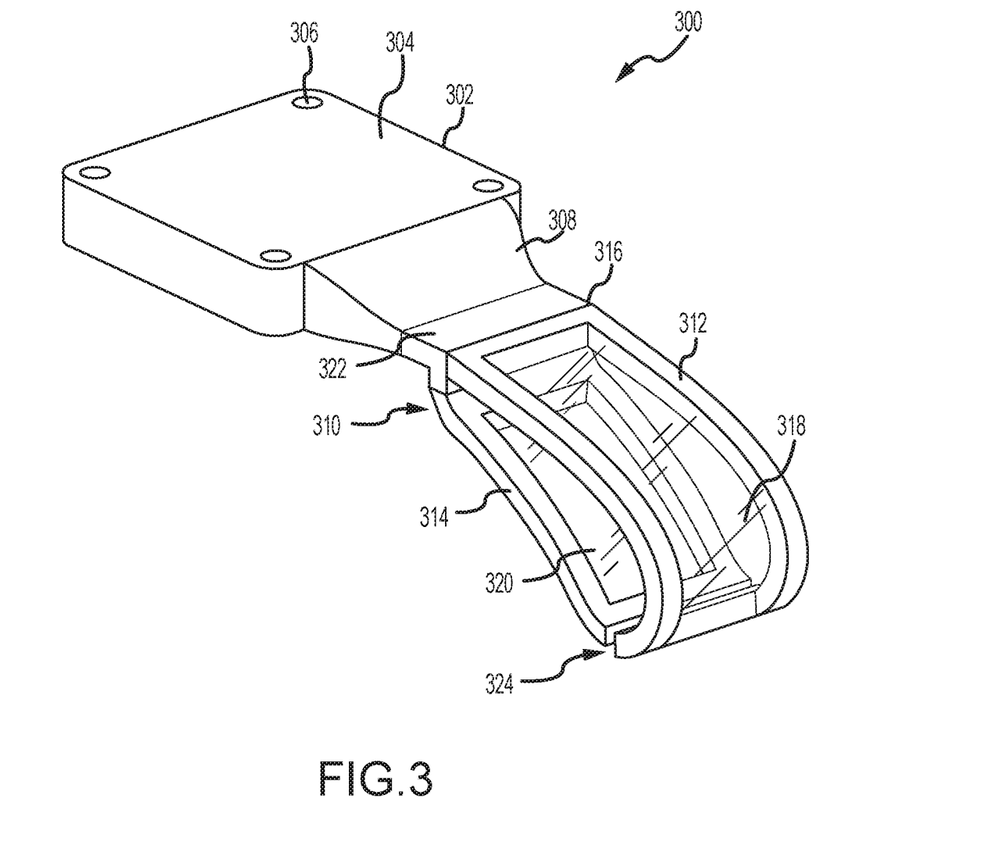
FIG. 3 illustrates a zero clamp force fixture, in accordance with various embodiments.

With additional reference to FIG. 3, zero clamping force fixture 300 is illustrated in accordance with various embodiments. Zero clamping force fixture 300 may comprise a relatively rectangular body 302 having a locating surface 304 comprising locating features 306. Locating surface 304 may be configured to mate with the distal surface of the locating plate 208 of universal locating feature 202. Body 302 may be coupled at locating features 306 to locating plate 208 by fasteners such as fasteners 210. A neck 308 may extend perpendicular of and relatively away from a side of body 302. Neck 308 may taper at least partially along its extent toward an interface 322 with zero force clamp 310. Zero force clamp 310 may comprise an upper jaw 312 and a lower jaw 314. Upper jaw 312 may be coupled to and extend relatively away from a hinge 316, located proximate interface 322, toward bite point 324. Lower jaw 314 may be fixed relatively below interface 322 and extend relatively beneath upper jaw 312 toward bite point 324. Upper jaw 312 may frame an upper curing window 318 set flush with upper jaw 312. In a like manner, lower jaw 314 may frame a lower curing window 320 set flush with lower jaw 314. In various embodiments, upper jaw 312 and lower jaw 314 may be curved to conform to a surface of an airfoil such as, for example, at least one of a turbine blade or a stator. Stated another way, the curve of upper jaw 312 and upper curing window 318 and the curve of lower jaw 314 and lower curing window 320 may be defined by a surface of an airfoil. In this regard, an interior surface of zero force clamp (i.e., interior surface of upper jaw 312 and interior surface of lower jaw 314) may conform to the surface of an airfoil. In various embodiments, a curing window such as upper curing window 318 or lower curing window 320 may comprise one of a glass, an acrylic, a sapphire, a fused silica, a fused quartz, a polycarbonate, and/or other media transmissive or substantially transmissive to ultra violet light.

Figure 4:
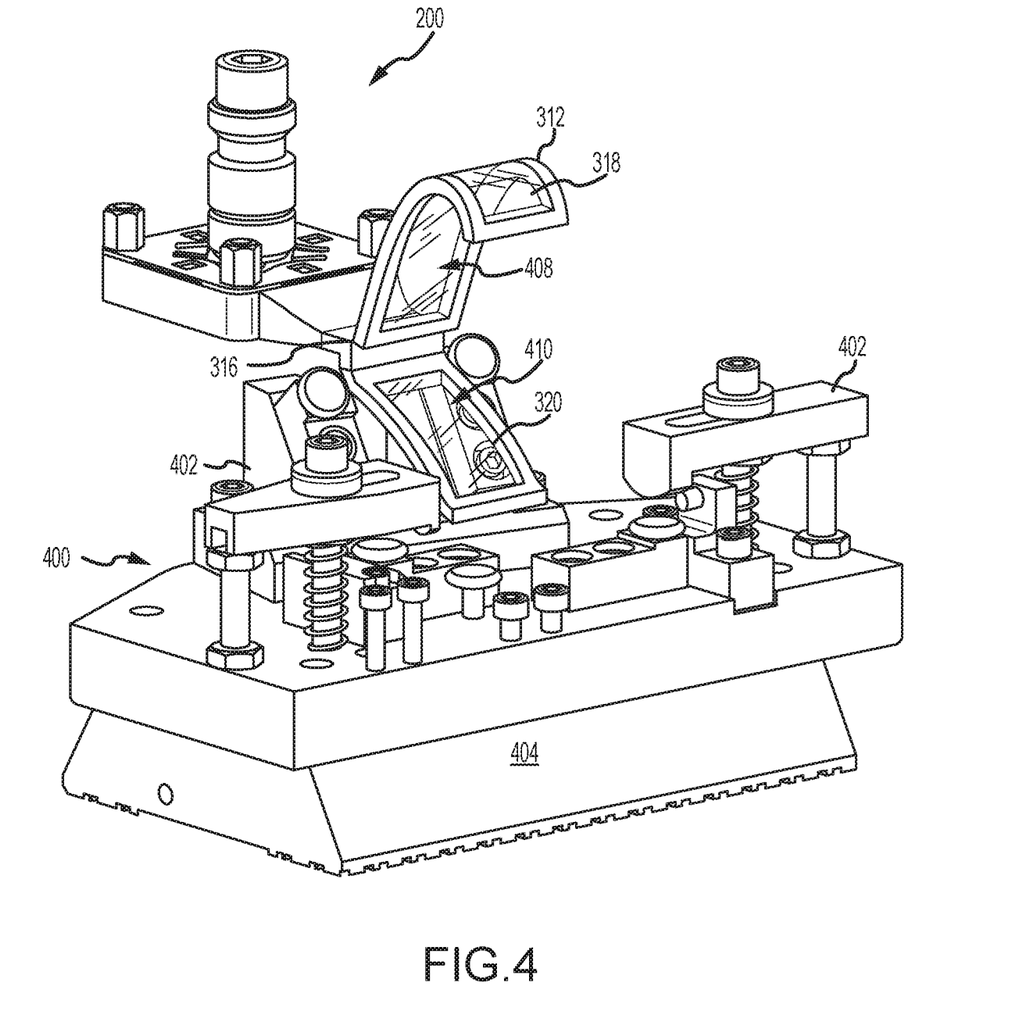
FIG. 4 illustrates a zero clamp force fixture assembly and locating nest, in accordance with various embodiments.

In various embodiments and with additional reference to FIG. 4, zero clamp force fixture assembly 200 is shown aligned with a nest 400. Nest 400 may comprise one or more couplings 402 configured to couple a work piece to base 404. Nest 400 may be configured to align the work piece at a desired alignment to zero clamp force fixture assembly 200. Upper jaw 312 is opened (rotated about hinge 316 relatively upward and away from lower jaw 314) and an adhesive is applied at interior surface 408 of upper jaw 312 and interior surface 410 of lower jaw 314. The adhesive may be applied as a layer evenly across the entirety of interior surface 408 including upper curing window 318 and across interior surface 410 including lower curing window 320. In various embodiments, the adhesive may be one of an ultra violet light curable adhesive resin or epoxy. In various embodiments the adhesive may form a layer over interior surface 408 and interior surface 410 between about 0.03 in [0.76 mm] and 0.06 in [1.52 mm] in thickness where about in this context means ±0.01 in [0.25 mm].

Figure 5:
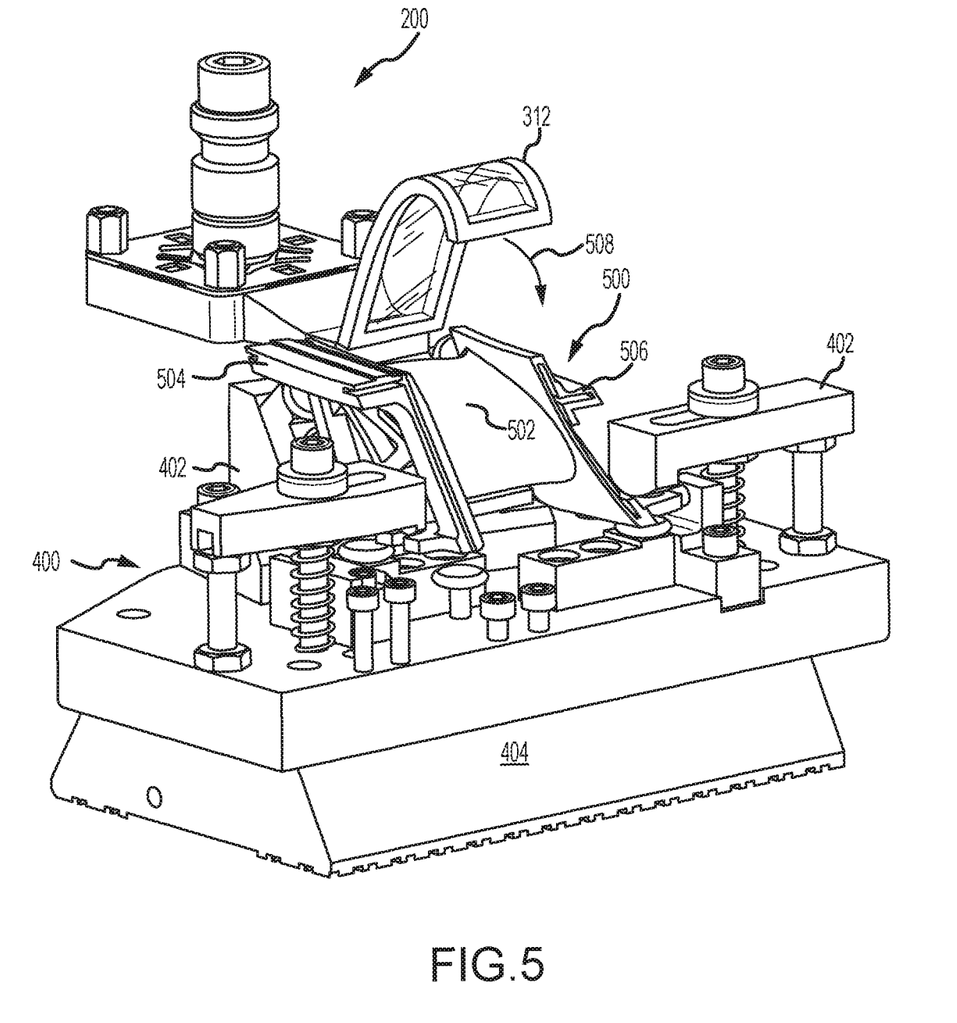
FIG. 5 illustrates a zero clamp force fixture assembly and locating nest, in accordance with various embodiments.

In various embodiments and with additional reference to FIG. 5, an airfoil 500 is illustrated fixed in nest 400 and inserted into zero force clamp 310 of zero clamp force fixture assembly 200. Airfoil 500 is coupled to nest 400 by couplings 402 and thereby aligned with zero clamp force fixture assembly 200. Airfoil surface 502 may extend between lower pedestal 504 and upper pedestal and airfoil 500 may be coupled to nest 400 by couplings 402 at lower pedestal 504 and upper pedestal 506. Coupling airfoil 500 in nest 400 and aligning nest 400 with zero clamp force fixture assembly 200 may bring airfoil surface 502 into contact with adhesive at interior surface 410 of lower jaw 314. With airfoil 500 aligned with zero clamp force fixture assembly 200, upper jaw 312 may be closed toward bite point 324 as shown by arrow 508 disposing interior surface 408 proximate airfoil surface 502 and thereby contacting the adhesive at interior surface 408 with airfoil surface 502.

Figure 6:
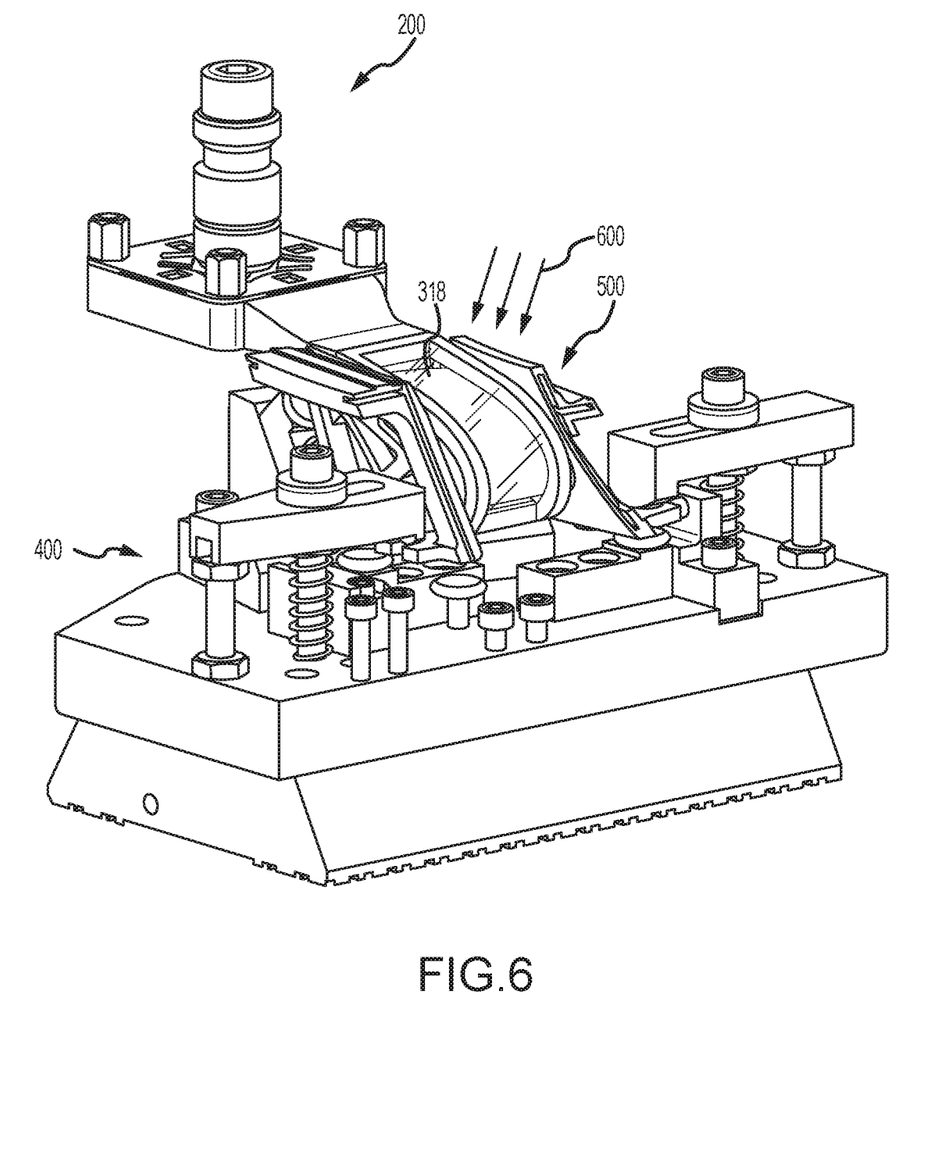
FIG. 6 illustrates a zero clamp force fixture assembly and locating nest, in accordance with various embodiments.

In various embodiments and with additional reference to FIG. 6, airfoil 500 is shown disposed within zero clamp force fixture assembly 200 and coupled to nest 400. Upper jaw 312 of zero clamping force fixture 300 is closed over lower jaw 314 with airfoil 500 held in alignment with zero clamp force fixture assembly 200 by nest 400. An ultra violet light 600 is applied to the adhesive through the upper curing window 318 and the lower curing window 320. In response to applying the ultra violet light 600, the adhesive is cured thereby coupling the airfoil 500 to the zero clamp force fixture assembly 200. In various embodiments, the ultraviolet light may have a wavelength between about 100 nm and 400 nm, or between about 150 nm and 350 nm, or between about 200 nm and 300 nm where about in this context means ±20 nm. In various embodiments, the ultra violet light may be applied for a duration of about 60 seconds where about in this context means ±45 seconds. In various embodiments, the cured adhesive layer may form a bonded layer defined between the airfoil surface 502 and each of the interior surface 408 and interior surface 410. The bonded layer may extend over about 10% to about 95% of the airfoil surface 502, or between about 45% to about 95% of the airfoil surface 502, or between about 85% to about 95% of the airfoil surface 502 where about in this context means ±5%.

Figure 7:
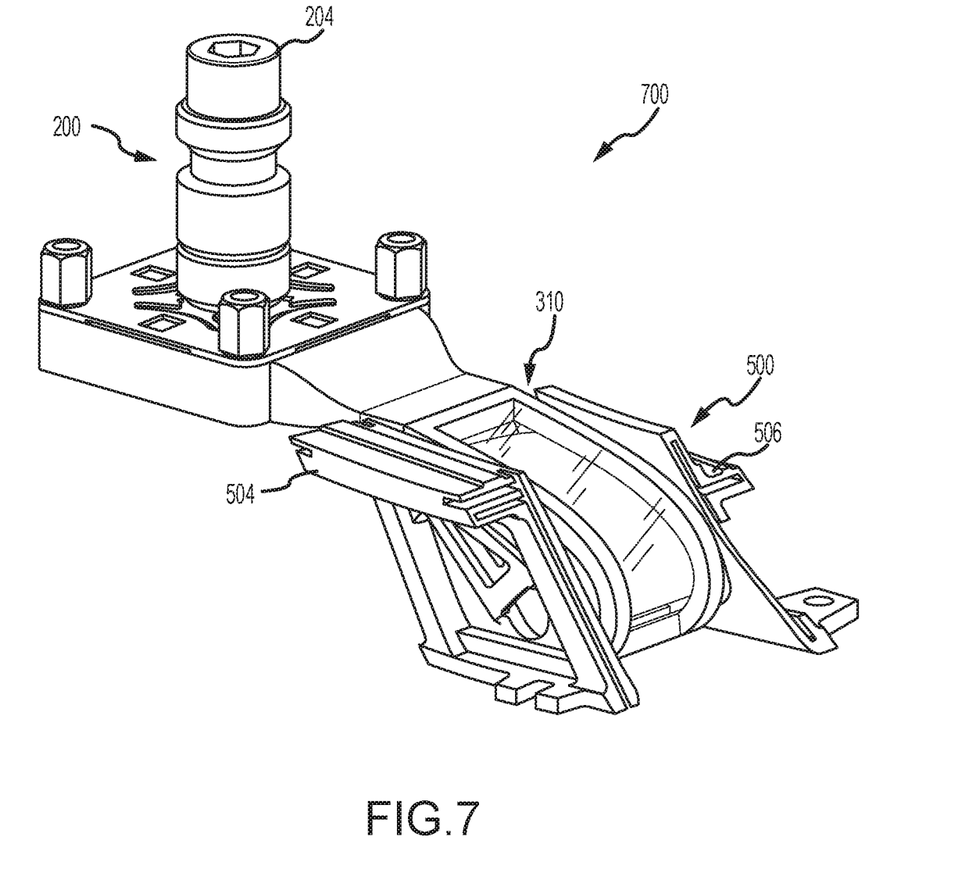
FIG. 7 illustrates a zero clamp force fixture and vane assembly, in accordance with various embodiments.

In various embodiments and as shown in FIG. 7, fixtured work piece 700 comprises zero clamp force fixture assembly 200 bonded to airfoil 500. In response to curing the adhesive layer, zero force clamp 310 is rigidly bonded to airfoil surface 502 tending thereby to unite zero clamp force fixture assembly 200 and airfoil 500 as a rigid body. In this regard, forces applied at lower pedestal 504 and upper pedestal 506 will tend to be distributed in a rigid mode through fixtured work piece 700. Stated another way, airfoil 500 will resist translation or rotation with respect to zero clamp force fixture assembly 200 and is thereby fixed relative to spigot 204.

Figure 8:
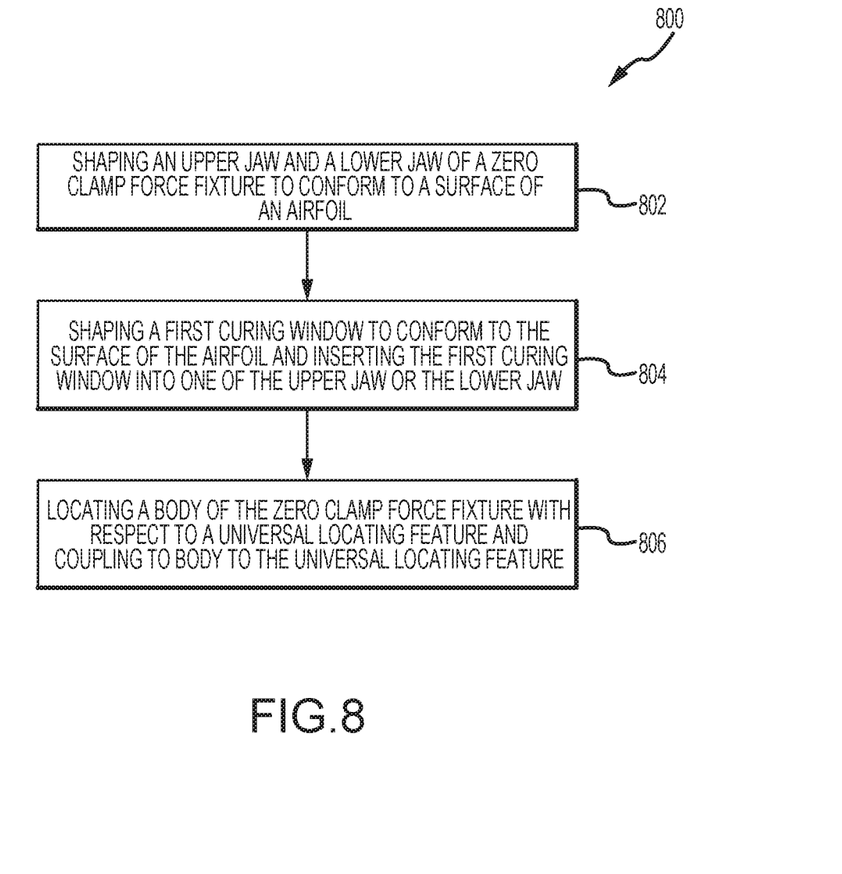
FIG. 8 illustrates a method of manufacturing a zero clamp force fixture assembly, in accordance with various embodiments.

In various embodiments and with reference now to FIG. 8, a method 800 of manufacturing a zero clamp force fixture assembly may comprise shaping an upper jaw and a lower jaw of a zero clamp force fixture to conform to a surface of an airfoil (step 802). Upper jaw 312 and lower jaw 314 may be shaped to conform to airfoil surface 502. Method 800 includes shaping a first curing window to conform to the surface of the airfoil and inserting the first curing window into one of the upper jaw or the lower jaw (step 804). Upper curing window 318 may be shaped to conform to airfoil surface 502 and inserted into upper jaw 312 and, in like manner, lower curing window 320 may be shaped to conform to airfoil surface 502 and inserted into lower jaw 314. Method 800 includes locating a body of the zero clamp force fixture with respect to a universal locating feature and coupling the body to the universal locating feature (step 806). Body 302 may be located with respect to locating plate 208 of universal locating feature 202 via locating features 306 at locating surface 304 and may be coupled to universal locating feature 202 via fasteners 210. Method 800 includes shaping a second curing window to conform to the surface of the airfoil and inserting the second curing window into one of the upper jaw or the lower jaw.

Figure 9:
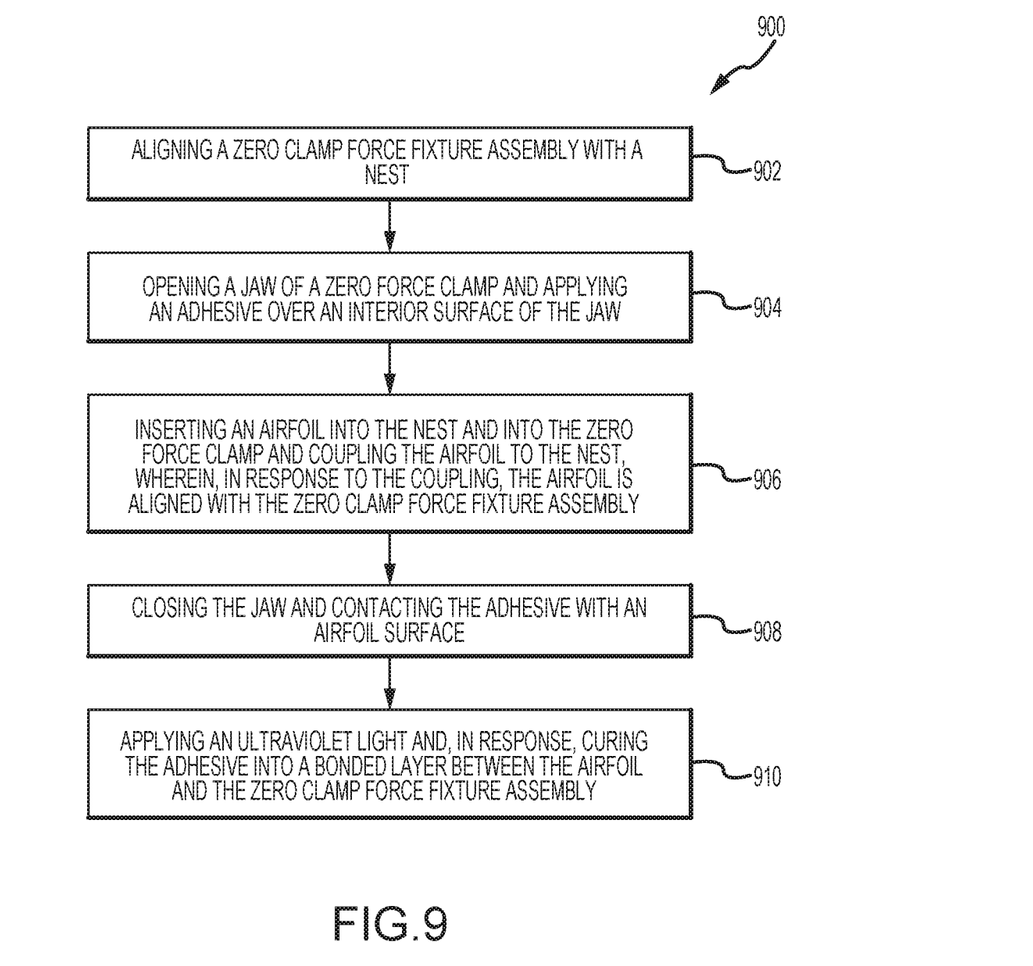
FIG. 9 illustrates a method fixturing an airfoil, in accordance with various embodiments.

In various embodiments and with reference now to FIG. 9, a method 900 of fixturing an airfoil may comprise aligning a zero clamp force fixture assembly with a nest (step 902). Zero clamp force fixture assembly 200 may be aligned relative to nest 400. Method 900 includes opening a jaw of a zero force clamp and applying an adhesive over an interior surface of the jaw (step 904). Upper jaw 312 may be opened by rotating about hinge 316 upward, relatively away from lower jaw 314 and bite point 324. An adhesive may be applied in a layer over interior surface 408 of upper jaw 312 and interior surface 410 of lower jaw 314. Method 900 includes inserting an airfoil into the nest and the zero force clamp and coupling the airfoil to the nest, wherein, in response to the coupling the airfoil is aligned with the zero clamp force fixture assembly (step 906). Airfoil 500 may be inserted into nest 400 and into zero force clamp 310 of zero clamp force fixture assembly 200. Airfoil may be coupled to nest 400 by couplings 402 and thereby aligned relative to zero clamp force fixture assembly 200. Method 900 includes closing the jaw and contacting the adhesive with an airfoil surface (step 908). Upper jaw 312 may be closed toward bite point 324 as shown by arrow 508 disposing interior surface 408 proximate airfoil surface 502 and thereby contacting the adhesive at interior surface 408 with airfoil surface 502. Method 900 includes applying an ultraviolet light and, in response, curing the adhesive into a bonded layer between the airfoil and the zero clamp force fixture assembly (step 910). Ultra violet light 600 is applied to the adhesive through the upper curing window 318 and the lower curing window 320. In response to applying the ultra violet light 600, the adhesive is cured thereby coupling the airfoil 500 to the zero clamp force fixture assembly 200.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A zero clamp force fixture assembly, comprising:
an airfoil;
a body comprising a locating surface and a side;
a neck extending away from the side of the body;
a zero force clamp coupled to the neck; and
a universal locating feature coupled to the locating surface,
wherein the neck tapers toward an interface with the zero force clamp,
wherein the zero force clamp further comprises an upper jaw and a lower jaw,
wherein the upper jaw is coupled to a hinge proximate the interface and configured to rotate upward, about the hinge, away from a bite point and the lower jaw,
wherein the lower jaw is fixed below the interface and extends beneath the upper jaw toward the bite point,
wherein the upper jaw comprises an upper curing window and the lower jaw comprises a lower curing window, wherein an interior surface of the upper jaw and an interior surface of the lower jaw are defined by an airfoil surface of the airfoil, and wherein the upper curing window and the lower curing window comprises at least one of, a glass, an acrylic, a sapphire, a fused silica, a fused quartz, or a polycarbonate.

2. The zero clamp force fixture assembly of claim 1, further comprising the airfoil coupled to the zero clamp force fixture assembly via an adhesive.

3. The zero clamp force fixture assembly of claim 2, wherein the adhesive forms an adhesive layer over the interior surface of the upper jaw and the interior surface of the lower jaw, wherein the adhesive layer is between 0.03 in and 0.06 in thick.

4. The zero clamp force fixture assembly of claim 3, wherein the adhesive layer is cured to form a bonded layer defined between the airfoil surface and each of the interior surface of the upper jaw and the interior surface of the lower jaw, wherein the bonded layer extends over 85% to 95% of the airfoil surface.

5. The zero clamp force fixture assembly of claim 4, wherein the adhesive comprises an ultraviolet curing adhesive.

6. A method of manufacturing a zero clamp force fixture assembly, the method comprising:
shaping an upper jaw and a lower jaw of a zero force clamp fixture to conform to a surface of an airfoil;
shaping a first curing window to conform to the surface of the airfoil and inserting the first curing window into the upper jaw;
shaping a second curing window to conform to the surface of the airfoil and inserting the second curing window into the lower jaw
locating a body of the zero force clamp fixture with respect to a universal locating feature; and
coupling the body to the universal locating feature,
wherein the body comprises a neck,
wherein the neck tapers toward an interface with the zero force clamp,
wherein the zero force clamp further comprises an upper jaw and a lower jaw,
wherein the upper jaw is coupled to a hinge proximate the interface and configured to rotate upward, about the hinge, away from a bite point and the lower jaw,
wherein the lower jaw is fixed below the interface and extends beneath the upper jaw toward the bite point,
wherein the upper jaw comprises the first curing window and the lower jaw comprises the second curing window,
wherein an interior surface of the upper jaw and an interior surface of the lower jaw are defined by the surface of the airfoil, and
wherein the first curing window and the second curing window comprise at least one of, a glass, an acrylic, a sapphire, a fused silica, a fused quartz, or a polycarbonate.

7. A method of fixturing an airfoil, the method comprising:
aligning a zero clamp force fixture assembly with a nest;
opening at least one of an upper jaw or a lower jaw of a zero force clamp and applying an adhesive layer over an interior surface of at least one of the upper jaw or the lower jaw;

inserting the airfoil into the nest and the zero force clamp and coupling the airfoil to the nest wherein, in response to the coupling, the airfoil is aligned with the zero clamp force fixture assembly;
closing at least one of the upper jaw or the lower jaw and contacting the adhesive layer with an airfoil surface; and
applying an ultraviolet light and, in response, curing the adhesive layer into a bonded layer between the airfoil and the zero clamp force fixture assembly,
wherein the zero force clamp fixture comprises a body and a neck extending away from a side of the body,
wherein the zero force clamp is coupled to the neck,
wherein the neck tapers toward an interface with the zero force clamp,
wherein the zero force clamp comprises the upper jaw and the lower jaw,
wherein the upper jaw is coupled to a hinge proximate the interface and configured to rotate upward, about the hinge, away from a bite point and the lower jaw,
wherein the lower jaw is fixed below the interface and extends beneath the upper jaw toward the bite point,
wherein the upper jaw comprises the first curing window and the lower jaw comprises the second curing window,
wherein an interior surface of the upper jaw and an interior surface of the lower jaw are defined by the surface of the airfoil, and
wherein the first curing window and the second curing window comprise at least one of, a glass, an acrylic, a sapphire, a fused silica, a fused quartz, or a polycarbonate.

8. The method of claim 7, wherein the adhesive layer is between 0.03 in and 0.06 in thick.

9. The method of claim 7, wherein the bonded layer extends over 85% to 95% of the airfoil surface.

10. The method of claim 7, wherein a wavelength of the ultraviolet light is between about 150 nm and 400 nm.

11. A zero clamp force fixture assembly for an airfoil, comprising:
a body comprising a locating surface and a side;
a neck extending away from the side of the body;
a zero force clamp coupled to the neck; and
a universal locating feature coupled to the locating surface,
wherein the neck tapers toward an interface with the zero force clamp,
wherein the zero force clamp further comprises an upper jaw and a lower jaw,
wherein the upper jaw is coupled to a hinge proximate the interface and configured to rotate upward, about the hinge, away from a bite point and the lower jaw,
wherein the lower jaw is fixed below the interface and extends beneath the upper jaw toward the bite point,
wherein the upper jaw comprises an upper curing window and the lower jaw comprises a lower curing window,
wherein an interior surface of the upper jaw and an interior surface of the lower jaw are defined by the shape of the surface of the airfoil, and
wherein the upper curing window and the lower curing window comprises at least one of, a glass, an acrylic, a sapphire, a fused silica, a fused quartz, or a polycarbonate.

* * * * *

UNITED STATES PATENT AND TRADEMARK OFFICE
CERTIFICATE OF CORRECTION

PATENT NO. : 10,906,146 B2
APPLICATION NO. : 16/016341
DATED : February 2, 2021
INVENTOR(S) : Matthew A. Mertens Page 1 of 1

It is certified that error appears in the above-identified patent and that said Letters Patent is hereby corrected as shown below:

In the Claims

Claim 6, Column 9, Line 28, delete "fixture"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*